(12) United States Patent
Chen et al.

(10) Patent No.: US 10,801,636 B2
(45) Date of Patent: Oct. 13, 2020

(54) ENERGY SAVING SYSTEM UTILIZING TEMPERATURE SENSING FLOW CONTROL VALVE TO CONTROL CHILLED WATER CIRCULATION

(71) Applicant: QUALITEK PRECISION INDUSTRIAL CO., LTD., Taipei (TW)

(72) Inventors: Tsung-Ming Chen, Taipei (TW); Kung-Chao Tung, Taipei (TW); Po-Cheng Tung, Taipei (TW)

(73) Assignee: QUALITEK PRECISION INDUSTRIAL CO., LTD., Taipei (TW)

( * ) Notice: Subject to any disclaimer, the term of this patent is extended or adjusted under 35 U.S.C. 154(b) by 93 days.

(21) Appl. No.: 16/055,023

(22) Filed: Aug. 4, 2018

(65) Prior Publication Data
US 2019/0360608 A1    Nov. 28, 2019

(30) Foreign Application Priority Data

May 25, 2018 (TW) .............................. 107117889 A

(51) Int. Cl.
*F16K 31/00*   (2006.01)
*F16K 31/02*   (2006.01)
(Continued)

(52) U.S. Cl.
CPC .......... *F16K 31/002* (2013.01); *F16K 31/025* (2013.01); *G05D 23/1326* (2013.01);
(Continued)

(58) Field of Classification Search
CPC ............. Y10T 137/7737; F16K 31/002; F16K 31/025; F16K 31/046; F16K 31/0091; F16K 37/0091; G05D 23/1921; G05D 23/1326
See application file for complete search history.

(56) References Cited

U.S. PATENT DOCUMENTS 4,034,801 A * 7/1977 Bernstein ............... F24F 3/0527
                                                                165/48.1
4,262,491 A * 4/1981 Chorey .................... F24F 11/83
                                                                62/185
(Continued)

FOREIGN PATENT DOCUMENTS

JP          5963433 A *  4/1984
JP          S597441 A *  4/1984
(Continued)

OTHER PUBLICATIONS

Machine Translation of JPS5963433A retrieved from espacenet.com (Year: 2020).*
(Continued)

*Primary Examiner* — Jessica Cahill
(74) *Attorney, Agent, or Firm* — Chun-Ming Shih; HDLS IPR Services

(57) ABSTRACT

An energy saving system utilizing temperature sensing flow control valve to realizing chilled water loop is provided, which includes an air blower, a temperature sensing flow control valve and a temperature setter. The air blower is disposed in the chilled water loop of a building to chill the air by the chilled water loop and then discharge the chilled air from the air outlet of the air blower. The valve is connected to a chilled water outlet beside the air blower and controls the flow of the chilled water flowing from the air blower to the chilled water loop. The temperature setter is connected to the valve and detects the temperature of the air (Continued)

discharged from the air outlet; the temperature setter opens or closes the temperature sensing flow control valve according to the detected air temperature and adjusts the flow of the chilled water by the valve.

2 Claims, 5 Drawing Sheets

(51) Int. Cl.
*G05D 23/19* (2006.01)
*G05D 23/13* (2006.01)
*F16K 31/04* (2006.01)
*F16K 37/00* (2006.01)

(52) U.S. Cl.
CPC ........ *G05D 23/1921* (2013.01); *F16K 31/046* (2013.01); *F16K 37/0091* (2013.01)

(56) References Cited

U.S. PATENT DOCUMENTS

| | | | | |
|---|---|---|---|---|
| 10,082,216 B1* | 9/2018 | Van Derven | .......... | F16K 31/046 |
| 2010/0083676 A1* | 4/2010 | Merritt | .................... | E03B 3/28 |
| | | | | 62/93 |
| 2015/0153119 A1* | 6/2015 | Friedl | .................... | F28F 27/00 |
| | | | | 165/293 |
| 2016/0291606 A1* | 10/2016 | Someya | ................ | F24F 5/0003 |
| 2018/0112886 A1* | 4/2018 | Boody | .................... | F24F 11/81 |
| 2018/0299169 A1* | 10/2018 | Suzuki | .................... | F25B 49/02 |

FOREIGN PATENT DOCUMENTS

| | | | | |
|---|---|---|---|---|
| JP | 2013053836 A | * | 3/2013 | |
| TW | M497217 U | | 3/2015 | |
| TW | M561157 U | | 6/2018 | |

OTHER PUBLICATIONS

Machine Translation of JP2013053836A retrieved from espacenet.com (Year: 2020).*

Machine Translation of JPS5974441 retrieved from espacenet.com (Year: 2020).*

* cited by examiner

ENERGY SAVING SYSTEM UTILIZING TEMPERATURE SENSING FLOW CONTROL VALVE TO CONTROL CHILLED WATER CIRCULATION

BACKGROUND OF THE INVENTION

1. Field of the Invention

The present invention belongs to the air conditioning field, in particular to an energy saving system utilizing temperature sensing flow control valve to realizing chilled water loop.

2. Description of the Prior Art

In general, the air conditioning system of a building is usually installed with a water chiller. The water chiller is just used to produce a large amount of chilled water and the chilled water flow to everywhere of the building via a chilled water loop. Each room of different floors of the building is installed with an air blower connected to the chilled water loop to inject the air into the chilled water loop and then discharge the chilled air so as to generate the chilled air.

For the purpose of saving energy, each of the air blowers has its own temperature controller; the temperature controller can detect the temperature of the chilled air blown from the air blower, disconnect the chilled water loop after the temperature reaches the target and realize the automatic temperature adjustment via a thermostatic valve.

However, the currently available temperature control method still has shortcomings, so its energy-saving effect is limited. FIG. 4 shows a common chilled water loop control system, which includes an air blower 100' and the air blower 100' is installed in the chilled water loop 410'. The chilled water loop 410' is provided with a triple valve 200' at a chilled water inlet entering the air blower 100' and a return pile 420' extends from the triple valve 200', such that the end of the return pipe 420' is connected to the chilled water loop 410' at the chilled water outlet of the air blower 100'. The air outlet 130' of the air blower 100' is provided with a temperature controller 300' and the temperature controller 300' is used to switch the working direction of the triple valve 200'.

By means of the above design, the currently available chilled water loop control system will inject the chilled water into the air blower 100' via the triple valve 200', so the temperature of the air blown by the air blower 100' can be decreased by the chilled water. The temperature controller 300' monitors the temperature on a real-time basis. When the temperature of the air outlet 130' of the air blower 100' decreases to a predetermined target, the temperature controller 300' switches the working direction of the triple valve 200' to the return pipe 420'. In this way, the chilled water of the chilled water loop 410' will bypass the air blower 100', remain the chilled status and be recycled to the chilled water loop 410', which can reduce the energy loss of producing chilled water to realize the object of energy saving.

However, the currently available method can only change the direction of the chilled water, but cannot control the flow of the chilled water. Thus, the real problem is that a large amount of chilled water still flows in the chilled water loop 410' and simultaneously absorb heat during the flowing process, which will increase the temperature of the chilled water, so it is necessary to produce more ice.

Accordingly, it is necessary to review the flow mechanism of the chilled water loop 410' in order to solve the problem of unnecessary energy loss.

In order to solve the above problems, the inventor of the invention has been engaged in the research of how to reduce the flow of the chilled water to reduce the waste of the chilled water in order to completely achieve the object of energy saving. Finally, the inventor of the invention successfully develops the energy saving system utilizing temperature sensing flow control valve to realizing chilled water loop.

The inventor of the application has developed several technologies able to precisely control the flow, such as Taiwan Patent Application No. 103220769 "FLOW CONTROL VALVE WITH TEMPERATURE SENSING FUNCTION", Taiwan Patent Application No. 107201651 "FLOW CONTROL VALVE", etc. The following content makes an illustration according to Taiwan Patent Application No. 107201651 (as shown in FIG. 5). The above cited patent discloses a flow control valve, which includes a control valve 1", a motor 12", a controller 4", a grating 5" and a connection module 3"; the flow control valve can be integrated with the energy saving system utilizing temperature sensing flow control valve to realizing chilled water loop in accordance with the present invention in order to achieve the object of energy saving.

The control valve 1" has a fluid inlet 11" and a fluid outlet 12", and there is a flow valve 13" disposed between the fluid inlet 11" and the fluid outlet 12". A flow switch 14" extends from the flow valve 13" and is used to open or close the flow valve 13". Thus, when the fluid flows into the fluid inlet 11' and passes through the flow valve 13" to adjust the flow, and then flows out from the fluid outlet 12". The motor 2" has an output shaft 21" to output power and the controller 4' is connected to the motor 2" so as to control the rotation angle of the output shaft 21" of the motor 2". One end of the grating 5" is connected to the output shaft 21" and the edge of the grating 5" is provided with a position sensor 51". The position sensor 51" detects the rotation of the edge of the grating 5" in order to obtain the rotation angle of the output shaft 21"; the position sensor 51" is further connected to the controller 4" to return the rotation angle so as to confirm whether the rotation is correct. The other end of the grating 5" is provided with a driving end 52" and the connection module 3" is connected to the position between the driving end 52" of the grating 5" and the flow switch 14" of the flow valve 13". A temperature sensor 41" is disposed aside the control valve 1'" to detect the temperature and the temperature data received by the temperature sensor 41" is connected to the controller 4" so as to determine the operation of controlling the output flow of the fluid.

The flow control valve device disclosed by the above cited patent can use the grating 5" to control the rotation of the motor 2" in order to determine the opening magnitude of the flow valve 13", such that the flow can adjusted by the flow valve 13" after the fluid enters the fluid inlet 11"; then the fluid is outputted from the fluid outlet 12"; in this way, the above cited patent can be integrated with the energy saving system utilizing temperature sensing flow control valve to realizing chilled water loop in accordance with the present invention in order to achieve the object of energy saving.

SUMMARY OF THE INVENTION

The major object of the present invention is to provide an energy saving system utilizing temperature sensing flow control valve to realizing chilled water loop, which can reduce the energy loss caused by producing ice by controlling the flow of the chilled water so as to realize most effective energy saving effect.

Another object of the present invention is to provide an energy saving system utilizing temperature sensing flow control valve to realizing chilled water loop with simple structure and able to be easily installed in all floors of a building in order to save energy.

To achieve the foregoing objects, the present invention provides an energy saving system utilizing temperature sensing flow control valve to realizing chilled water loop, which mainly includes an air blower, a temperature sensing flow control valve and a temperature setter.

The air blower is disposed in the chilled water loop of a building, which includes a chilled water inlet and a chilled water outlet. The chilled water in the chilled water loop flows into the air blower via the chilled water inlet and the air blower is turned on to make the air flow through the chilled water to chill the air. Then, the chilled air is discharged from the air outlet of the air blower and the used chilled water is recycled to the chilled water loop via the chilled water outlet.

The temperature sensing flow control valve is connected to the chilled water loop beside the air blower, such that the temperature sensing flow control valve can control the flow of the chilled water passing through the air blower to return to the chilled water loop.

The temperature setter is connected to the temperature sensing flow control valve and detects the temperature of the air of the space around the air blower. The temperature sensing flow control valve will be opened or closed according to the temperature detected by the temperature setter and then the temperature sensing flow control valve adjusts the flow of the chilled water according to the temperature.

In practical operation, if the temperature is high, the opening magnitude of the temperature sensing flow control valve is increased to increase the flow of the chilled water so as to swiftly decrease the temperature of the air discharged from the air blower. If the temperature is low, the opening magnitude of the temperature sensing flow control valve is decreased to decrease the flow of the chilled water. When the temperature reaches the temperature decrease requirement, the temperature setter closes the temperature sensing flow control valve to stop the flow of the chilled water.

Via the above control mechanism, the flow of the chilled water can be effectively reduced; therefore, the working burden of producing the chilled water can be decreased, which can actually achieve energy saving.

In one embodiment, the temperature sensing flow control valve is connected to the chilled water outlet of the air blower in order to effectively control the flow of the chilled water passing through the air blower.

In one embodiment, the temperature sensing element of the temperature setter is disposed at the position close to the air outlet of the air blower

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
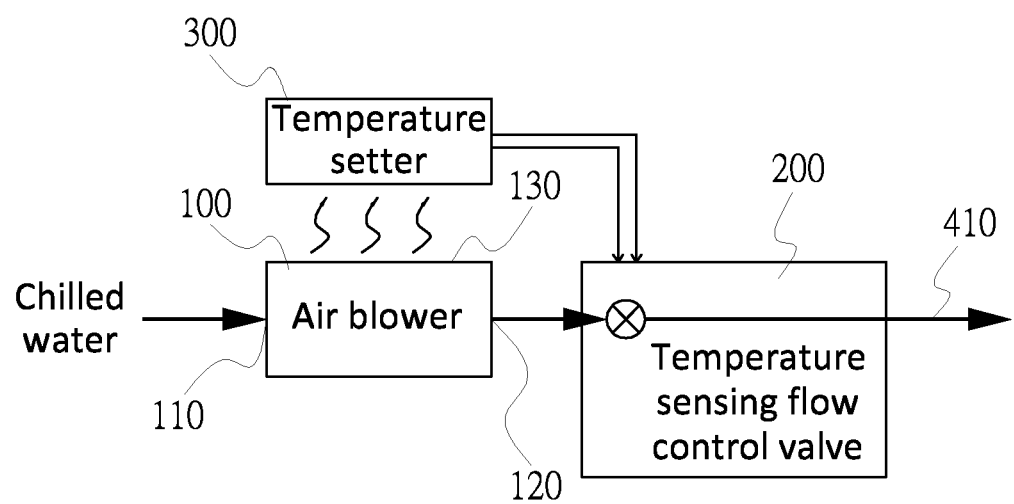
FIG. 1 is a structural block diagram in accordance with the present invention.
Figure 2:
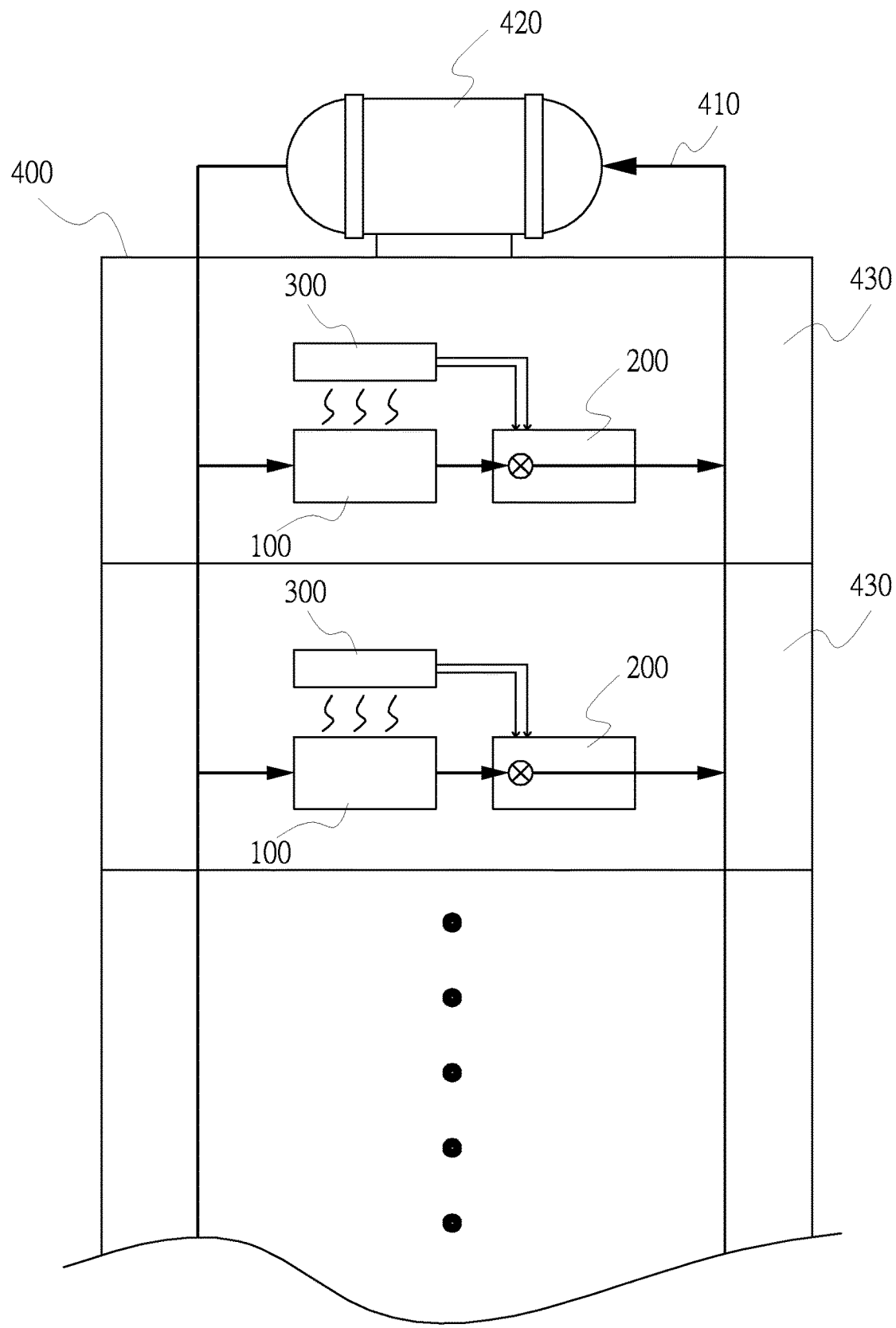
FIG. 2 is an application embodiment diagram in accordance with the present invention.

Please refer to FIG. 1 and FIG. 2; the present invention provides an energy saving system utilizing temperature sensing flow control valve to realizing chilled water loop, which mainly includes an air blower 100, a temperature sensing flow control valve 200 and a temperature setter 300.

The air blower 100 is a device used to control the air flow, which may be a common air fan and has a chilled water inlet and a chilled water outlet 120. The air blower 100 is disposed in the chilled water loop 410 of a building 400 and the chilled water loop 410 is connected to a water chiller 420, so the produced chilled water can flow into the chilled water loop 410. Then, the chilled water in the chilled water loop 410 is injected into the air blower 100 via the chilled water inlet 110 and the air blower 100 is turned on to make the air flow through the chilled water to chill the air. Next, the chilled air is discharged from the air outlet 130 of the air blower 100 and the used chilled water is recycled to the chilled water loop 410 via the chilled water outlet 120. Afterward, the water chiller 420 re-starts to produce the chilled water according to the temperature of the recycled chilled water; the above cycle keeps being repeated.

Thus, if the flow of the chilled water in the chilled water loop 410 can be reduced, the working burden of the water chiller 420 can be naturally decreased, which can achieve the effect of energy saving.

For the integration with the above air blower 100, the temperature sensing flow control valve 200 is connected to the chilled water loop 410 beside the air blower 100. In the embodiment, the temperature sensing flow control valve 200 is connected to the chilled water outlet 120 of the air blower 100, which allows the temperature sensing flow control valve 200 to control the flow of the chilled water passing through the air blower 100 and returning to the chilled water loop 410.

The temperature setter 300 is connected to the temperature sensing flow control valve 200 and is used to detect the temperature of the air of the space 430 around the air blower 100. Preferably, the temperature setter 300 is disposed at the air outlet 130 close to the air blower 100. Then, the temperature sensing flow control valve 200 can be opened or closed according to the temperature of the air detected by the temperature sensing element of the temperature setter 300. After the temperature sensing flow control valve 200 is opened, the flow of the chilled water can be adjusted according to the temperature of the air. If the temperature is high, the flow of the chilled water should be increased so as to increase the temperature decreasing effect of the air discharged from the air blower 100; on the contrary, if the temperature decreases, the flow of the chilled water should be decreased. When the temperature of the air has reached the temperature decrease requirement, the temperature setter 300 closes the temperature sensing flow control valve 200 in order to make the chilled water stop flowing, which can effectively decrease the flow of the chilled water in order to achieve the effect of energy saving.

It is worthy to point out that the temperature sensing flow control valve 200 adopted by the invention can serve as the flow control device of the chilled water, so the invention does not need a large and complicated control system. Thus, the temperature sensing flow control valve 200 adopted by the invention may be the valve disclosed by any one of the inventor's two previous patents, Taiwan Patent Application No. 103220769 "FLOW CONTROL VALVE WITH TEMPERATURE SENSING FUNCTION" or Taiwan Patent Application No. 107201651 "FLOW CONTROL VALVE". Thus, the temperature sensing flow control valve 200 can be modularized, of light weight and easily to be installed, so can achieve the effect of energy saving.

Figure 3:
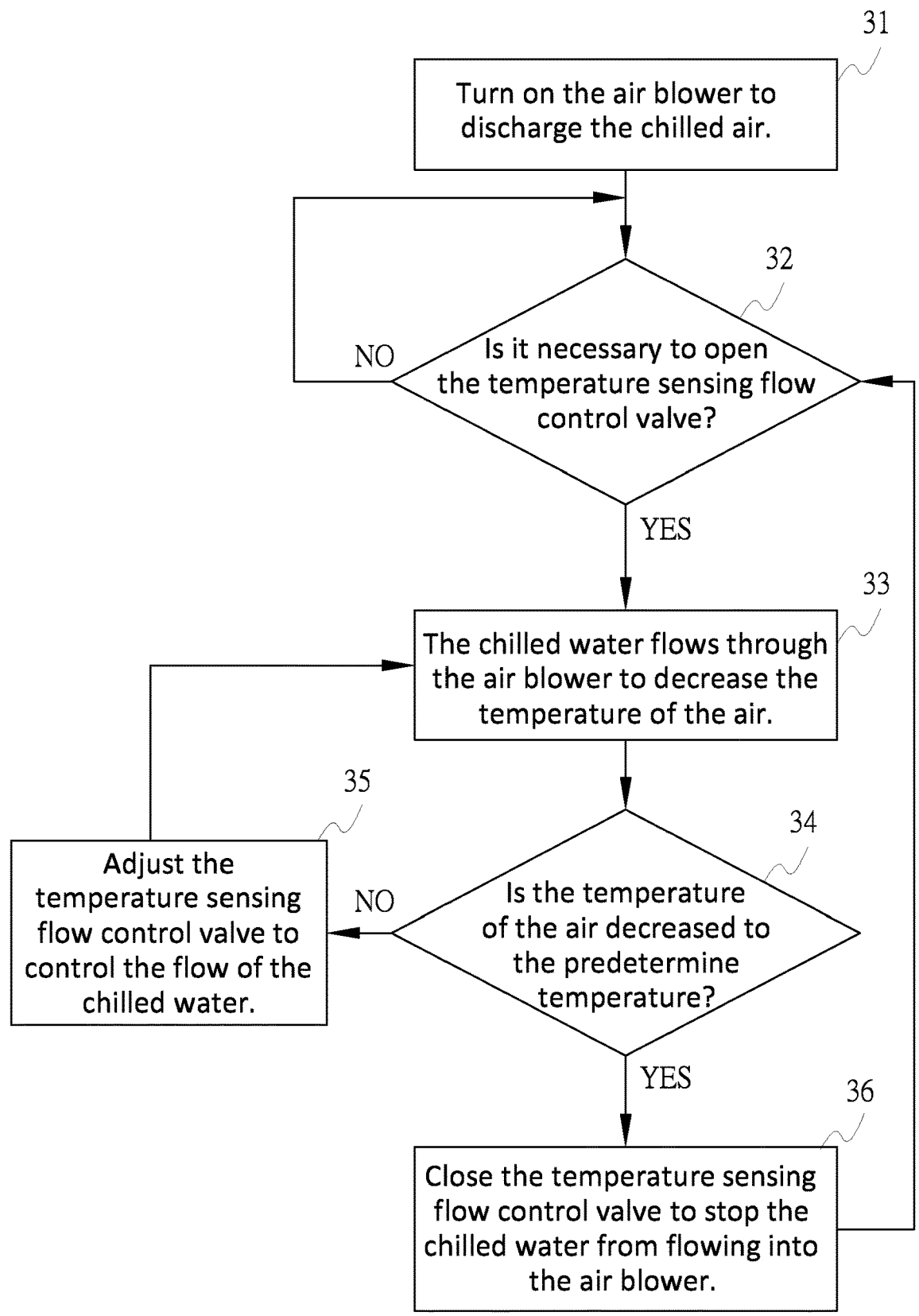
FIG. 3 is an operational flow chart in accordance with the present invention.
Figure 4:
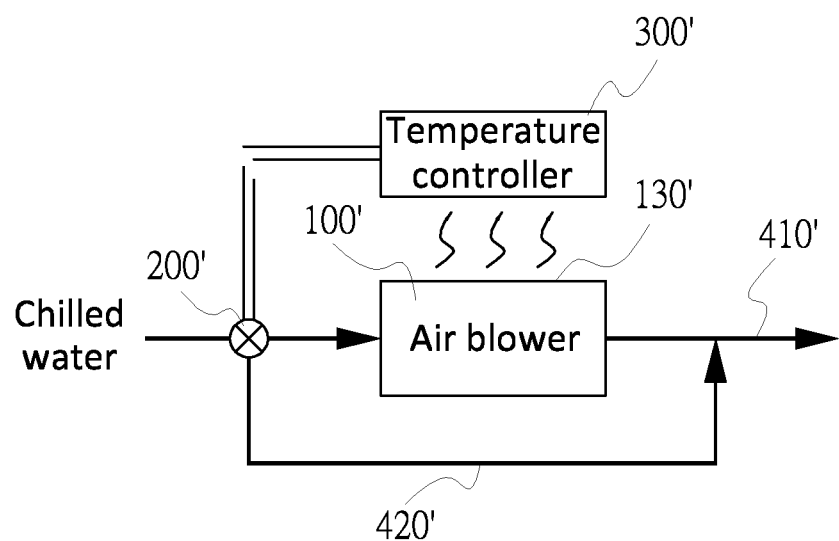
FIG. 4 is a structural block diagram of the prior art.
Figure 5:
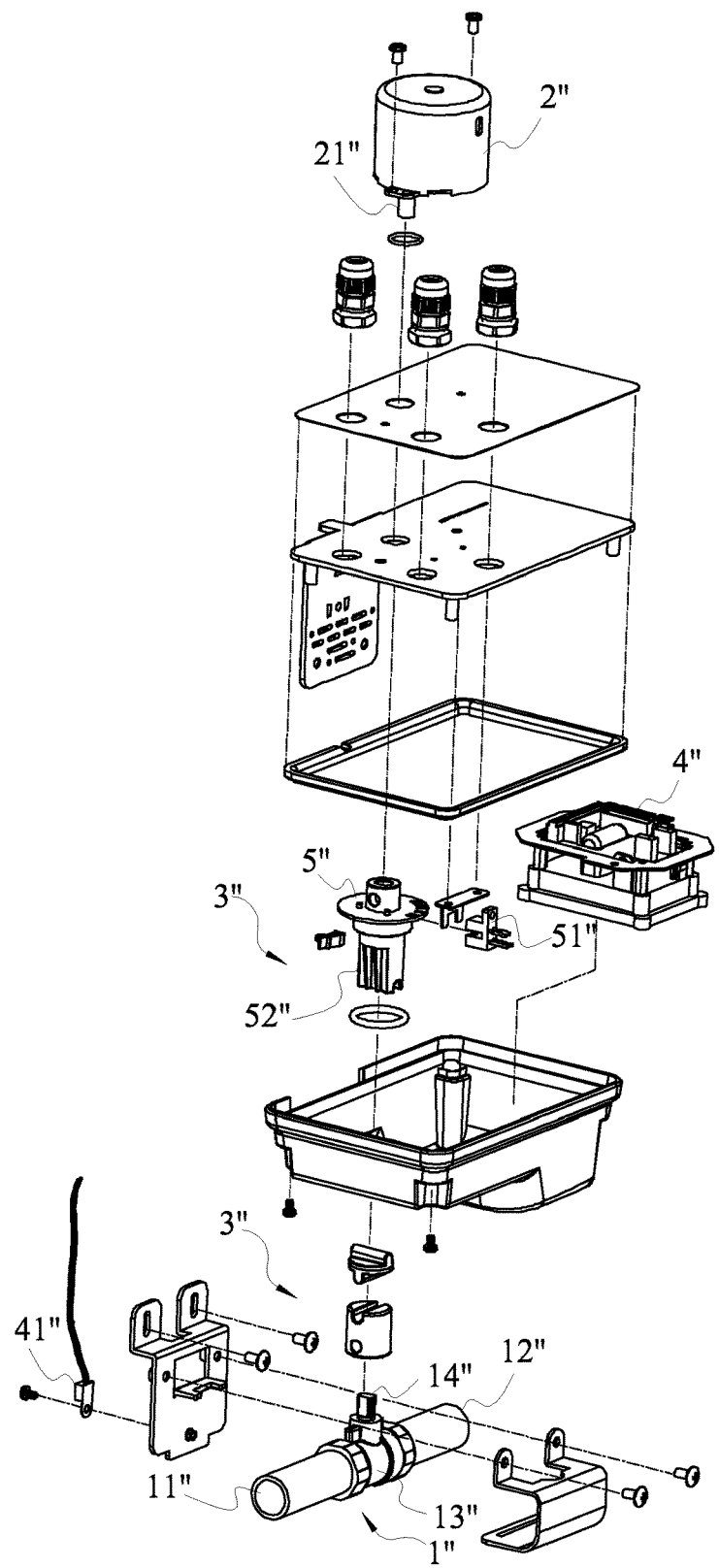
FIG. 5 is an exploded view of Taiwan Patent Application No. 107201651.

Please refer to FIG. 3, the implementation steps of the present invention are, based on the cooperation between the aforementioned elements, briefly described as follows:

Step 31: turning on the air blower 100 to inject the air into the air blower 100 and discharging the chilled air from the air outlet 130 of the air blower 100 after the air is chilled;

Step 32: keeping monitor the temperature of the air by the temperature setter 300 and opening the temperature sensing flow control valve 200 to control the flow of the chilled water when the temperature of the air increases to the predetermined temperature upper limit;

Step 33: after the temperature sensing flow control valve 200 is opened, the chilled water in the chilled water loop 410 flows through the air blower 100 to reduce the temperature of the air discharged from the air blower 100;

Step 34: the temperature sensing flow control valve 200 determines whether the temperature of the air is decreased to the predetermined temperature?

Step 35: if the temperature of the air fails to reach the target, adjusting the temperature sensing flow control valve 200 to control the flow of the chilled water according to the temperature decrease requirement, and then repeating the temperature monitoring process;

Step 36: when the temperature of the air is decreased to the target, the temperature sensing element of the temperature setter 300 transmits a signal to close the temperature sensing flow control valve 200 to stop the chilled water in the chilled water loop 410 from flowing through the air blower 100 so as to achieve the effect of energy saving.

The aforementioned structure and steps are just one of the ways of implementing the technical features of the present invention; all designs utilizing the temperature sensing flow control valve 200 to realize the flow control of the chilled water should be within the scope of the appended claims of the present invention.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An energy saving system utilizing temperature sensing flow control valve to control chilled water circulation, comprising:
   an air blower, disposed in a chilled water loop of a building and operable to chill an air by the chilled water loop in order to discharge a chilled air from an air outlet of the air blower;
   a temperature sensing flow control valve, connected to the chilled water loop beside the air blower and operable to control a flow of a chilled water flowing from the air blower to the chilled water loop; and
   a temperature setter, connected to the temperature sensing flow control valve and operable to adjust a dimension of an opening of the temperature sensing flow control valve according to a temperature detected by a temperature sensing element of the temperature setter.

2. The energy saving system utilizing temperature sensing flow control valve to control chilled water circulation of claim 1, wherein the temperature sensing flow control valve is connected to a chilled water outlet of the air blower.

* * * * *